INVENTOR.
Heinrich BROSCHKE
BY
Toulmin & Toulmin
ATTORNEYS

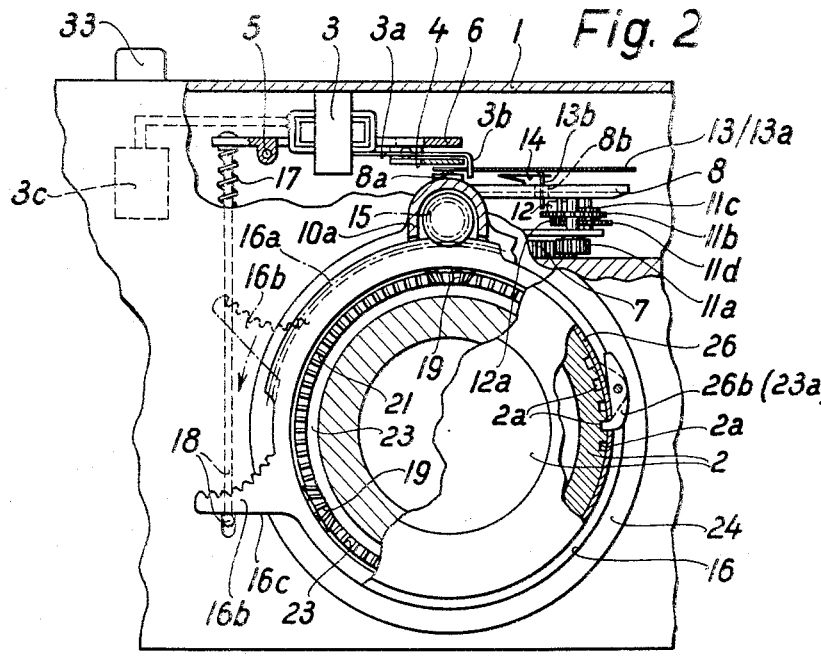
Feb. 23, 1960 — H. BROSCHKE — 2,925,760
EXPOSURE CONTROL DEVICE
Filed Jan. 28, 1958 — 3 Sheets-Sheet 1
INVENTOR.
Heinrich BROSCHKE
BY Toulmin & Toulmin
ATTORNEYS Feb. 23, 1960  H. BROSCHKE  2,925,760
EXPOSURE CONTROL DEVICE
Filed Jan. 28, 1958  3 Sheets-Sheet 2

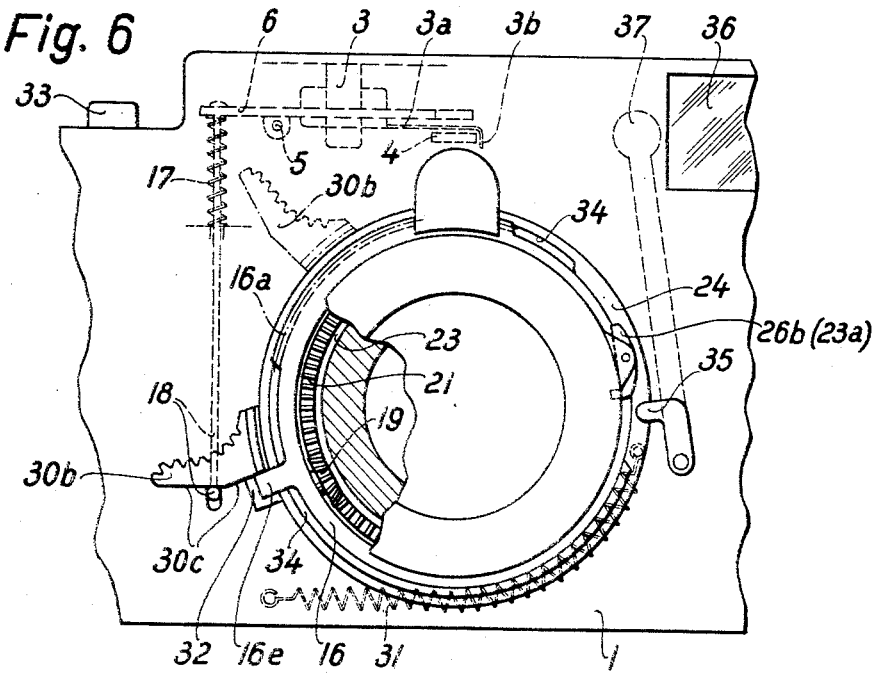
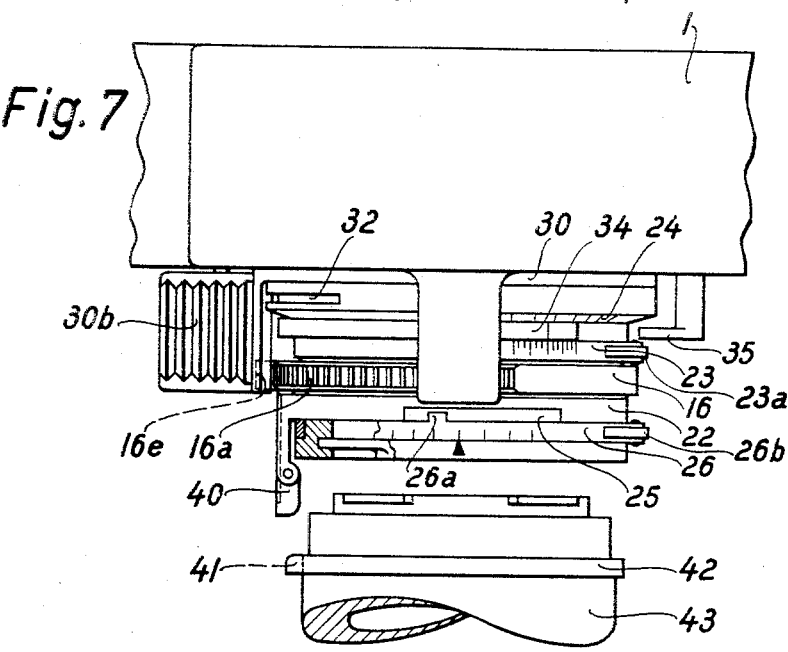

United States Patent Office 2,925,760
Patented Feb. 23, 1960

2,925,760

EXPOSURE CONTROL DEVICE

Heinrich Broschke, Wetzlar, Germany, assignor to Ernst Leitz G.m.b.H., Wetzlar, Germany Application January 28, 1958, Serial No. 711,619

Claims priority, application Germany January 29, 1957

11 Claims. (Cl. 95—10)

The present invention relates to cameras for photographic or cinematographic purposes. More in particular, the present invention relates to an automatic exposure control device adapted to set either one of the exposure factors, i.e. either the time of exposure or the opening width of the diaphragm after one of the two factors has been preselected.

It is known in the art to equip photographic or cinematographic cameras with an exposure adjustment device wherein one of the two factors determining the exposure of the film, i.e. the time of exposure or the opening width of the diaphragm, is preselected while the other of the two factors is set by a photo-electric device.

These known devices are extremely complicated and expensive. The setting of the second exposure factor is effected in dependency upon the release of the shutter. As soon as the release of the shutter is initiated, the instrument pointer is arrested. This excludes the possibility of making repeated measurements; a checking of the accuracy of a measurement can only be done by repeated measurements entailing the loss of valuable film material.

It is an object of the present invention to provide an exposure control device for use with cameras which operates independently from the release of the shutter and which is susceptible to repeated settings without loss of valuable film material.

It is another object of the present invention to provide an exposure control device for use with cameras which has a very simple and uncomplicated structure and which operates very reliably and accurately.

It is a further object of the present invention to provide a driving assembly, particularly for use with an exposure control device in cameras which is capable of adjusting, with a minimum of energy, relatively large forces.

Other objects and advantages of the present invention will become apparent as the description thereof proceeds.

These objects are achieved by the exposure control device and the drive gear assembly of the present invention comprising a photo-electric light meter having an instrument pointer and a drive gear assembly. The instrument pointer can be locked and then serves as a stop member limiting the run-off movement of the drive gear assembly, the latter automatically adjusting one of the two relevant exposure factors, namely time of exposure or opening width of the diaphragm independently from the elements actuating the shutter so as to be susceptible to repeated tensioning and run-off without actuating the shutter.

The drive gear assembly of the present invention comprises a contact member directly cooperating with the sensitive instrument pointer, a locking gear assembly and a wing wheel associated therewith, the contact member acting directly upon the wing wheel of the locking gear.

According to a preferred embodiment of the invention there is provided one common straining member for the exposure control device, the shutter, and, eventually, the film feed means of the camera.

The invention will be better understood upon the following detailed description of the accompanying drawings, wherein:

Figure 1 is a top view, partly in section, of a part of a photographic camera with the objective and the control device of the present invention, the latter being in tensioned position;

Figure 2 is a front view, partly in section, of a part of a photographic camera with the control device of the present invention, shown in Figure 1;

Figure 6 is a front view of part of a camera having, according to a preferred embodiment of the present invention, a common tensioning member for the control device, the shutter, and eventually the film feed, and means for indicating the limit of the automatically adjustable exposure time;

Figure 7 is a top view of part of a camera having, according to a preferred embodiment of the present invention, a common tensioning member for the control device, the shutter, and eventually the film feed, and means for indicating the limit of the automatically adjustable exposure time.

Figure 4:
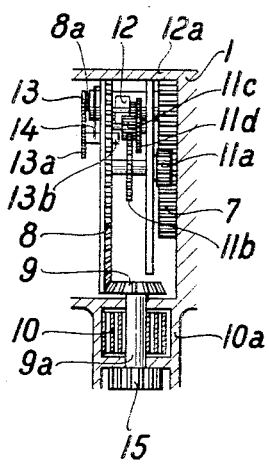
Figure 4 is a partly sectional view of the drive gear in the control device of the present invention.

Referring now to the drawings more in detail and turning first to Figure 1, a photographic camera has a casing 1 and an objective lens system 2. The galvanometer 3 of a photoelectric light meter is supplied with current from a schematically indicated photoelectric cell 3c, and has a pointer 3a. The free end of this pointer is bent so as to be hook shaped. The pointer is so arranged as to allow for a slight play above the contact segment 4 connected to the casing 1. A bracket 6 is positioned above the instrument pointer 3a and can be swivelled about shaft 5. By means of this bracket 6 the instrument pointer 3a can be pressed against the segment 4 and can be locked therewith.

The toothed segment 7 is fixedly connected with the casing 1 and is arranged in the vicinity of the instrument pointer 3a. Another toothed segment 8 is positioned within reach of this toothed segment 7 and coaxially therewith. The toothed segment 8 can be swivelled about the shaft 8a fixedly connected with the casing 1 and it is in driving connection with a bevel gear 9 mounted on a shaft 9a. The toothed segment 8 and the bevel gear 9 thus form a driving gear assembly.

The one extremity of a coil spring 10 is fixed to the shaft 9a while the other extremity of this spring 10 is fixed at the spring box 10a. The toothed segment 8 and the braking and locking gear system 11a—12 are swivelled around shaft 8a into the position shown in Figure 1 by turning the tensioning member 16 in the direction indicated by the arrow appearing in Figure 2 of the drawings. Simultaneously with this displacement of the toothed segment 8 and a braking and locking gear system 11a—12, the spring 10 is tensioned. If the tensioning member 16 is released, the tensioned spring 10 returns the toothed segment 8 to its initial position, which return movement is, however, braked by the braking and locking gear 11a—12, so that a steady and controlled return movement of segment 8, as is conventional in the case of spring-driven gears, is thereby effected.

The braking and locking gear system is constituted by the gears 11a, 11b, 11c, 11d and, driven by gear 11a, a winged gear 12 which is braked during rotation by means of the resistance offered by the air to the rapidly rotating wings 12a of this winged gear 12. The driving element of this system is formed by the gear 11a which permanently intermeshes with the teeth of the toothed segment 7 which is rigidly fixed in the casing 1. The gear 11a is adapted to act as a free wheel during the movement of the toothed segment 8, when spring 10 is tensioned as described above, and to act as a driving gear for the other gears of the braking and locking system during the detensioning return movement or "run off" of said segment 8.

A stop member 13 has a roughened, knurled, curved rim 13a and can be swivelled about shaft 8a of the toothed segment 8. In addition, the stop member 13 can be adjusted relative to the toothed segment 8 within predetermined limits. The shape of the curved rim is chosen with a view to adjust to the deflection of the instrument pointer the necessary displacement of the control elements for setting the time of exposure and the opening of the diaphragm of the camera. The stop member 13 has a bent stop arm 13b which protrudes through the recess 8b of the toothed segment 8 into the swivelling range of the wing-bearing gear 12 (see Figures 1, 2 and 4). The spring 14 acting upon the stop member 13a tends to keep the stop arm 13b out of the swivelling range of the wing-bearing gear 12. The swivelling range of the stop member 13 relative to the toothed segment 8 is limited to the extension of the recess 8b of the toothed segment 8 and the width of the stop arm 13b.

Figure 3:
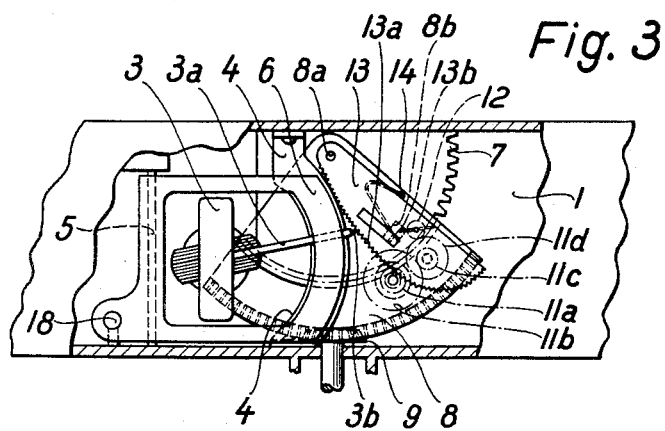
Figure 3 is a top view of the control device of the invention in the end position after having run off.

A gear 15 is mounted upon the shaft 9a of the bevel gear 9. A tensioning member 16 is rotatably attached to the casing 1 of the photographic camera and has a toothed segment 16a. The gear 15 mates the toothed segment 16a of the tensioning member 16 (see Figures 1, 2 and 3).

The greatest possible displacement for tensioning the tensioning member 16 approximately corresponds to the swivelling range of the toothed segment 8. The tensioning member 16 is provided with a handle 16b having a contact surface 16c. A switch rod 18 is fixed to the bracket 6 (see Figure 1) and is under the influence of a spring 17. The spring 17 tends to lock the instrument pointer 3a via the bracket 6 with the stop segment 4. At the end of the tensioning displacement the tensioning member 16 acts upon the switch rod 18 of the bracket 6 via the contact surface 16c of its handle 16b.

Bevel gears 19 are associated with the tensioning member 16 and cooperate with corresponding teeth 20, 21 of a setting member 22 or 23, respectively, used for setting either time of exposure or the opening width of the diaphragm, respectively, (see Figures 1, 2, 3 and 5). The tensioning member has teeth 16a and forms, together with the bevel gears 19 and the teeth 20, 21 of the setting members 22, 23 a differential gear system (see Figure 5). The setting member 22 for adjusting the diaphragm has a recess 25, the length of which corresponds to the range of adjustment of the diaphragm. The detent 26a of the diaphragm preselector member 26 projects into this recess. The preselector member 26 is arrested in its respective position by means of a pawl 26b resting in holes 2a of the objective casing.

The shutter of the camera is released independently from the control means setting the exposure factors. The ring 23 setting the time of exposure can therefore also be devised as a preselector member similar to the diaphragm preselector 26, in which instance the ring 23 limits the displacement of a member participating in the run-off of the shutter. It is, however, also possible, to disengageably couple the setting ring 23 with a setting member 24 of the shutter; for this purpose a pawl coupling can be employed similar to the coupling elements 26b, 2a for preselecting the desired diaphragm opening. This disengageable coupling is used for setting additional exposure factors as, for example the sensitivity of the film, filter factors and the like.

Since the adjusting elements of the photographic camera, as, for instance the setting members 22 and 23, are in constant engagement with the tensioning member 16 and the swivelling toothed segment 8, the preselection of one of the setting elements of the camera determines the distance of the displacement of the tensioning member 16 following the influence of spring 10.

It is well known that the shutters of cameras are susceptible to a predetermined, limited range of automatic adjustment of the shutting period only. In particular, prolonged closing periods of the shutter require a counting of the exposure time on the part of the operator and are not susceptible to automatic operation. It is therefore desirable to equip the camera with means indicating the limit up to which the time of exposure can be controlled automatically.

This can be done as shown in Figures 6 and 7 of the accompanying drawings, by equipping the automatically adjustable time setting member 23 with a switch curve 34 acting in the marginal position upon the switch lever 35 of a mark 37 which can be swivelled into the range of the view finder 36. As soon as this mark 37 appears in the view finder, the operator is alerted that a marginal value has been reached requiring special attention and adjustment.

Figure 5:
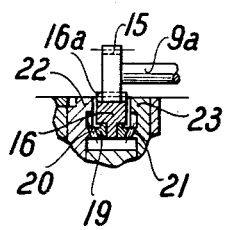
Figure 5 is a partly sectional view of the transmission means between the control device and the setting member of a camera of the present invention.

According to another, preferred embodiment of the control device of the present invention, the tensioning of the shutter and the control device is effected by one common tensioning member 30. Furthermore, the film feed or transport can be effected together with the tensioning of the shutter. At the same time, the release of the shutter is again done independently from the operation of the control device. Figures 5 and 6 show this preferred embodiment of the invention, wherein a tensioning member 30 is positioned freely rotatable on the casing of the photographic camera. The handle 30b of this tensioning member 30 has a stop surface 30c. At the end of the tensioning movement the handle 30b actuates the switch rod 18. After the handle 30b has been released, a spring 31 returns the tensioning member 30 to its initial, resting position. The distance covered by the tensioning member remains in all instances constant. A tensioning member 32 for tensioning the shutter and eventually for transporting the film, as well as a detent 16e of the tensioning member 16 for the control device project into the range of operation of the handle 30b. All other elements of the control device correspond to the basic embodiment shown in Figures 1 through 5. The distinguishing feature of the preferred embodiment shown in Figures 6 and 7 thus resides in the provision of a tensioning member 30 having a handle 30b, which temporarily communicates with the tensioning member 16 of the control device. At the same time, the tensioning member 30 tensions the shutter via the tensioning member 32 and eventually transports the film by the requisite amount (i.e. by the length of one picture). Again, the control device is susceptible to repeated operation short of releasing the shutter. Shutter release 33 and handle 30b are spaced from each other, although both are within reach of one hand of the operator.

*Operation*

The device of the present invention operates in the following manner.

It shall be assumed that a diaphragm value is preselected as determined by the position of the preselection member 26 shown in Figure 1. It shall be further assumed that a film sensitivity has been chosen as determined by the position of the time setting ring 23 relative to the diaphragm setting member 24 (Figure 1), and that the resting position of the tensioning member 16 corresponds to the position determined by the handle 16b as shown by the dash-dotted lines in Figure 2.

The control device is put in operation by moving the handle 16b from its resting position downwardly in the direction indicated by the arrow shown in Figure 2. Thereby the spring 10 is tensioned and the toothed segment 8 with the braking and locking gear assembly 11a—14 is brought into the position shown in Figure 1. At the end of this tensioning operation the contact surface 16c of the handle 16b of the tensioning member 16 actuates the switch rod 18. The switch rod 18 is moved against the influence of spring 17 and thereby the bracket 6 is removed from the pointer 3a and the segment 4, thus unlocking the same. The pointer 3a, 3b of the galvanometer is released and can freely adjust itself to the current supplied by the photoelectric cell 3c.

As soon as the handle 16b of the tensioning member 16 is released, the tensioning member is forced back to its initial position by the spring 10. This return movement is transmitted to the toothed segment 8 via the gear elements 16a, 15, 9a and 9. The speed of the return movement of the toothed segment 8 and hence the speed of the return movement of the tensioning member 16 is determined by the braking and locking gear assembly 11, 12 mounted upon the toothed segment 8. The wing-bearing gear 12 of the locking gear assembly is swiftly rotated by the gear 11a rolling along the fixed toothed segment 7. At the start of the return movement of the tensioning member 16 the connection between the contact surface 16c of the tensioning member 16 and the switch rod 18 is severed. Consequently, the spring 17 causes the bracket 6 to stop the pointer 3a and to lock the same in its deflected position on the support segment 4.

The setting members 22 and 23 join the return movement or run-off of the tensioning member 16 via the differential gears 19, 20, 21. However, the movement of the diaphragm setting member 22 is limited by the rims of recess 25 against which the detent 26a of the diaphragm preselector 26 comes to rest. Thereafter, only the time setting member 23 and the shutter setting member 24 coupled with the former continue the displacement. After a predetermined run-off period of the tensioning member 16 and the toothed segment 8, the curved rim 13a of the stop member 13—which participates in the run-off—comes to rest against the bent end 3b of the locked instrument pointer 3a. The member 13 is stopped, while the toothed segment 8 continues to move until the stop arm 13b of the member 13 comes within reach of the wing wheel 12 and finally arrests the latter. This is the end of the run-off movement of the toothed segment 8 and the tensioning member 16 and accordingly, of the setting operation of the diaphragm setting member 22 and the time setting member 23, respectively. The final position of the toothed segment 8 and hence the tensioning member 16 connected therewith corresponds to the light value represented by the locked position of the instrument pointer 3. The tensioning member as well as the toothed segment 8 thus are indicative of the light value; this may be expressed in numerical terms by a gauged scale and a reading mark (not shown). By means of the differential gears 19, 20, 21 between the tensioning member 16 and the diaphragm setting member 22 and the time setting member 23, this light value is distributed as functionally interrelated diaphragm and time values upon the setting members 22, 23, also taking into consideration the preselected setting value.

In the adjusted position of the control device, the diaphragm and time factors are set in accordance with the prevailing and measured light value. By releasing the shutter of the photographic camera the exposure is effected which corresponds exactly to the measured light value.

The adjustment can be repeated at will by repeatedly tensioning and releasing the control device in the manner just described. This can be done without releasing the shutter and it is therefore possible to adjust the camera to quickly changing light conditions by repeating the tensioning and releasing operation of the control device short of releasing the shutter. Release of the shutter and adjustment of the exposure factors by operating the control device are clearly separated from one another. While both the shutter release 33 and the handle 16b of the control device are within reach of the same hand of the operator, both are well spaced from each other, taking into consideration the run-off period of the control device so that the time required for moving the hand from the handle 16b to the shutter release 33 is longer than the run-off period of the control device. Consequently, the run-off movement of the control device is completed before the operator can reach the shutter release and the release of the shutter cannot interfere with the setting of the exposure factors by the control device.

The control device of the present invention as described hereinbefore can be mounted into all types of cameras having an objective, at least part of which is connected to the camera casing. It is also applicable to cameras with exchangeable objectives, but a few modifications in the control device are then required in order to make it possible to connect the exchangeable objective with the diaphragm setting member of the control device. Such coupling means are shown, for example, in Figure 7 in which the diaphragm setting member 22 of the control device is provided with a coupling pawl 40 cooperating with a coupling member 41 of the diaphragm setting member 42 associated with the respective exchangeable objective 43. The elements of this coupling are so arranged that in the coupled position the effective connection between the coupling members 40 and 41 results in the desired accurate opening position of the diaphragm corresponding to the actual position of the diaphragm setting member 42.

It will be understood that this invention is susceptible to modification in order to adapt it to different usages and conditions, and, accordingly, it is desired to comprehend such modifications within this invention as may fall within the scope of the appended claims.

What I claim is:

1. In a camera having a conventional camera shutter and objective diaphragm and setting means for both said shutter and said diaphragm, an exposure control device comprising, in combination: a photo-electric light meter comprising an instrument pointer, locking means for locking said instrument pointer in its stroke position, a spring operated drive system which is manually movable from a rest position into a tensioned position and which returns from tensioned to rest position upon release, said drive system comprising a differential gear train mechanically connected to said setting means and said objective diaphragm, each of said setting means being adapted to be preset in preselected shutter time or diaphragm value positions independently of each other and of said mechanical connection with said differential gear train, said drive system further comprising a stop member co-acting with said instrument pointer when the latter is in locked position so as to limit the return movement of said drive system and thereby automatically setting the non-preset one of the said two setting means in that position which corresponds to the light value characterized by the locked stroke position of said instrument pointer.

2. The combination defined in claim 1 wherein the camera comprises a conventional handle for releasing said shutter and wherein said drive system further comprises a handle for manually tensioning said drive system, said handles being arranged within the reach of the same hand of an operator but so spaced from each other that the time required for moving the hand from said tensioning handle to said shutter release handle exceeds the duration of run-off of said exposure control device.

3. The combination defined in claim 2 wherein said locking means are adapted to be actuated in response to the position of said tensioning handle.

4. The combination defined in claim 1 wherein said locking means comprise fixed abutment means, a pivotable bracket adapted to engage said instrument pointer for pressing the same against said abutment means, spring means acting upon said bracket for urging the same to press said instrument pointer against said abutment means, and a connecting member mechanically interconnecting said bracket and said drive system for pivoting said bracket against the action of said spring means away from said instrument pointer when said drive system is in said tensioned position thereof.

5. The combination defined in claim 4 wherein said drive system further comprises a handle for manually tensioning said drive system and wherein said connecting member is elongated, one end of said connecting member being connected to said bracket and the other end being adapted to be engaged by said handle, when said drive system is moved into tensioned position thereof, so as to cause pivoting of said bracket against the action of said spring means.

6. The combination defined in claim 1 wherein said spring operated system further comprises a fixed shaft, a first toothed segment rotatable about said shaft, and having a recess, a spring influencing said segment, a braking and locking gear system mounted upon said toothed segment and comprising a driving gear and a wing-bearing gear, a second toothed segment fixedly mounted co-axially relative to said first toothed segment and engaging said driving gear of said braking and locking gear assembly, a stop member having a stop arm, said stop member being adapted for swivelling motion about said shaft relative to said first toothed segment within predetermined limits, said stop arm projecting through said recess in said first toothed segment into the range of rotation of said wing bearing gear of said braking and locking gear assembly, a tensioning member having a toothed portion, a gear meshing with the toothed portion of said tensioning member, a gear engaging said toothed segment of said drive system, said tensioning member being adapted to tension said spring influencing said toothed segment and to bring said drive system into its tensioned position, an assembly of bevel gears associated with said tensioning member, a first and a second setting member adapted to control the exposure factors time and diaphragm, a first setting member adapted to adjust the diaphragm of the camera, a second setting member adapted to adjust the exposure time, a preselector member adapted to preselect one of the exposure factors and limiting the path of that of said setting members adjusting the respective exposure factor, disengageable coupling means disposed intermediate said first and said second setting member and adapted to effect the preselection of additional exposure factors.

7. The combination defined in claim 1, wherein said spring operated drive system further comprises a fixed shaft, a first toothed segment rotatable about said shaft, and having a recess, a spring influencing said segment, a braking and locking gear system mounted upon said toothed segment and comprising a driving gear and a wing-bearing gear, a second toothed segment fixedly mounted co-axially relative to said first toothed segment and engaging said driving gear of said braking and locking gear system, a stop member having a stop arm, said stop member being adapted for swivelling motion about said shaft relative to said first toothed segment within predetermined limits, said stop arm projecting through said recess in said first toothed segment into the range of rotation of said wing-bearing gear of said braking and locking gear system, said stop member having a curved, roughened rim constituting a contact surface for said instrument pointer.

8. The combination defined in claim 1, further comprising a tensioning member common to said spring operated drive system, the shutter and the film feed means of the camera, and a reset spring influencing said common tensioning member.

9. The combination defined in claim 1, further comprising a tensioning member common to said drive system, the shutter and the film feed means of the camera, a reset spring influencing said tensioning member, the latter having a handle formed with a contact surface; said locking means comprising a fixed abutment surface, a pivotable bracket adapted to engage said instrument pointer for pressing the same against said abutment surface, spring means acting upon said bracket for urging the same to press said instrument pointer against said abutment surface, and an elongated connecting rod connected at one end thereof to said bracket and adapted to be engaged at its other end by said contact surface of said handle, when said drive system is in said tensioned position thereof, for pivoting said bracket against the action of said spring means away from said instrument pointer.

10. The combination defined in claim 1, further comprising coupling means for disengageably linking said diaphragm setting member of the control device and the diaphragm adjusting means of an exchangeable objective of the camera.

11. The combination defined in claim 1, further comprising means for indicating the limit of the automatically adjustable range of the time of exposure.

References Cited in the file of this patent

UNITED STATES PATENTS

| | | |
|---|---|---|
| 2,058,531 | Tuttle | Oct. 27, 1936 |
| 2,150,365 | Dziewior | Mar. 14, 1939 |
| 2,188,820 | Riszdorfer | Jan. 30, 1940 |
| 2,206,626 | Blechner | July 2, 1940 |
| 2,838,985 | Burger | June 17, 1958 |